G. H. WINSLOW.
PULLEY GUARD.
APPLICATION FILED FEB. 24, 1910.

968,304.

Patented Aug. 23, 1910.

Witnesses
J. G. Hinkel
Charles N. Murray

Inventor
G. H. Winslow
By Eugene C. Brown
Attorney

UNITED STATES PATENT OFFICE.

GEORGE H. WINSLOW, OF SOUTH HADLEY, MASSACHUSETTS.

PULLEY-GUARD.

968,304.  Specification of Letters Patent.  Patented Aug. 23, 1910.

Application filed February 24, 1910. Serial No. 545,625.

*To all whom it may concern:*

Be it known that I, GEORGE H. WINSLOW, a citizen of the United States, residing at South Hadley, in the county of Hampshire and State of Massachusetts, have invented new and useful Improvements in Pulley-Guards, of which the following is a specification.

My invention relates to guard devices designed for use with machines of any character wherein a pulley, gear wheel or other rotary member is employed either for receiving or transmitting mechanical energy.

The primary object of my invention is to provide a device of the character hereinafter specified which can be conveniently applied to a pulley or the like for the purpose of preventing parts of a person's body, or clothing, or shop accessories coming in contact with the pulley or gear wheel.

It is obvious that my device could be applied to shield any moving parts, such for instance as fly-wheels, etc.

Other objects and advantages of my invention will be apparent to machinists and others skilled in the art from the following description in connection with the accompanying drawings, in which—

Figure 1:
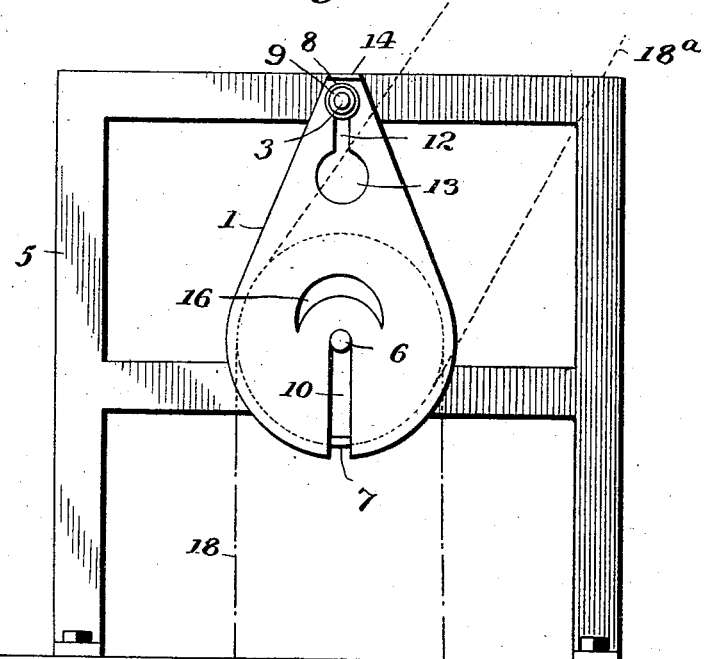
Figure 2:
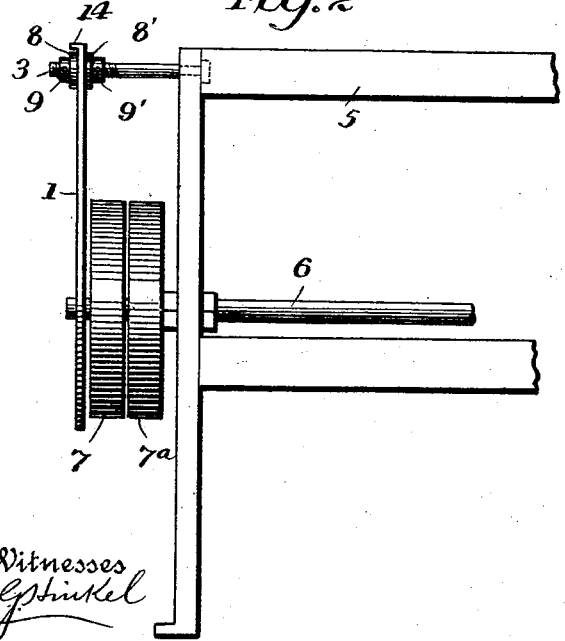
Figure 3:
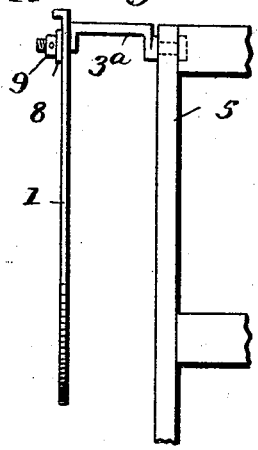

Figure 1 is a side elevation of my invention showing the manner of attaching it in position over a pulley shaft; Fig. 2 is an end elevation of the same; and Fig. 3 is an end elevation showing a modified form of supporting stud.

The pulley guard or shield constituting my invention is shown at 1, and comprises a disk or plate which may be suspended from a stud 3, or other support secured to the frame 5 of the machine or other structure supporting the shaft 6, carrying loose and fast belt pulleys 7, 7$^a$, which it is desired to guard.

The guard plate may conveniently be held in position between collars 8, 8', secured on the stud 3 by lock nuts 9, 9'. For the purpose of preventing lateral movement and centering the guard plate in front of the pulleys, I provide a slot extending inwardly from the periphery and which slides over the projecting end of the pulley shaft. A slot 12 terminating in an enlarged aperture 13, enables the guard to be easily removed from the stud, by grasping the finger-piece or lug 14 and raising the plate until the aperture is in alinement with the collar 8.

The form of guard which I prefer to employ is a plate having a lower portion somewhat wider and conforming substantially to the circumference of the pulley and tapering upwardly toward the point of suspension.

To facilitate oiling the loose pulley, an arcuate aperture 16 is provided in the plate concentric with the pulley shaft and just above the hub of the pulley.

When the driving belt passes over the pulley from below as shown at 18, the straight stud shown in Fig. 2 may be used. In case, however, the driving belt passes over the pulley from above as shown in dotted lines at 18$^a$, I prefer to use a stud with an off-set portion 3$^a$ as shown in Fig. 3, which may be turned to one side or the other for the purpose of furnishing a greater clearance space for the belt. It is obvious that this form may also be used when the belt passes over the pulley from below.

The usefulness and advantages of my invention will be apparent to those familiar with factory and mill machinery. It frequently happens that a careless factory-hand or operator is caught in the belt and may have a hand or a part of the clothing carried between the belt and pulley, often causing serious accidents. I believe I am the first to provide a shield or guard for running pulleys and which may be easily suspended in front of a pulley and readily detached in case of necessity.

I have illustrated and described a particular form of guard plate to show an embodiment of my invention, but it is evident that changes may be made therein without departing from the spirit of my invention or the scope of my claims.

It will also be apparent that my guard or shield may be used in connection with gearing as well as with belt pulleys.

Having now fully described my invention, I claim and desire to secure by Letters Patent—

1. A shield or guard for rotary members, comprising a disk or plate having an upper portion provided with a slot terminating in an enlarged aperture to receive and lock over a headed stud or support, and a lower portion to cover the rotary member and provided with a slot to slidingly engage the shaft of the rotary member and with an aperture above said slot to afford access to the rotary member, and means for adjusting and locking said plate in different positions on said support.

2. The combination with a pulley and belt, of a guard or shield comprising a plate or disk having an upper portion provided with a slot terminating in an enlarged aperture, and a lower portion conforming substantially to said pulley and provided with a slot to slidingly engage and guide the disk upon the pulley shaft, and a stud or support having an offset portion and a retaining member over which said aperture and slot may pass and lock.

In testimony whereof I have hereunto set my hand in presence of two subscribing witnesses.

GEORGE H. WINSLOW.

Witnesses:
ELEANOR A. BROOKS,
ARTHUR S. GAYLORD.